(No Model.)

E. W. HAYS & E. A. THUSTON.
TIRE TIGHTENER.

No. 522,162. Patented June 26, 1894.

Witnesses
R. A. McAdory
A. J. Ware

Inventors
Edward W. Hays
Eli A. Thuston
By their Attorney P. Byrne

UNITED STATES PATENT OFFICE.

EDWARD WARD HAYS, OF VANDIVER, AND ELI ALEX THUSTON, OF AVONDALE, ALABAMA.

TIRE-TIGHTENER.

SPECIFICATION forming part of Letters Patent No. 522,162, dated June 26, 1894.

Application filed April 7, 1894. Serial No. 506,783. (No model.)

*To all whom it may concern:*

Be it known that we, EDWARD WARD HAYS, of Vandiver, in the county of Shelby, and ELI ALEX THUSTON, of Avondale, in the county of Jefferson, State of Alabama, citizens of the United States, have invented certain new and useful Improvements in Tire-Tighteners; and we do hereby declare the following to be a full, clear, and exact description of the invention, such as will enable others skilled in the art to which it appertains to make and use the same.

Our invention relates to improvements in that class of tire tighteners for vehicle wheels which expands the rim of the wheel to tighten the tire; and the objects of our improvement are, first, to provide a tire tightener for wheels that will be simple and cheap to construct, that can be readily adjusted to fit various sizes of wheel rims the device to be operated in expanding the wheel rim to tighten the tire; second, to provide a tire tightener to be operated by clamping the device on the rim of a wheel and forcing the rim apart at the joint to insert a wedge to keep the rim expanded thereby tightening the tire on the wheel; third, to provide a device for tightening the tire on wheels of vehicles which can be operated without removing the wheels from the vehicle or requiring the tire to be taken off the wheel to cut and weld or to upset as in the method now generally used for that purpose. We attain these objects by the mechanism and the operation of the device illustrated in the accompanying drawings, in which—

Figure 1:
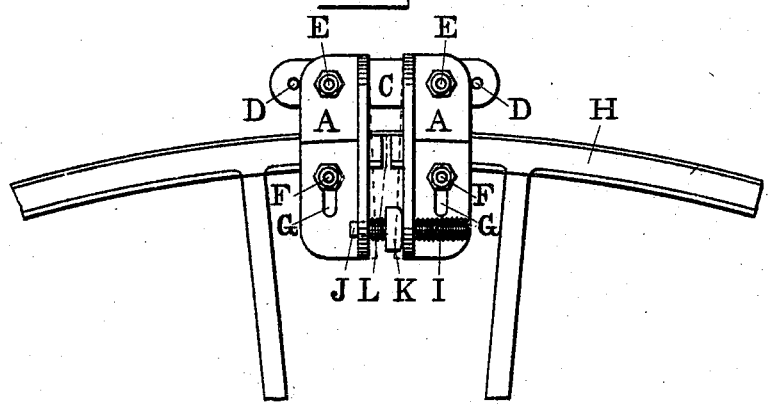
Figure 2:
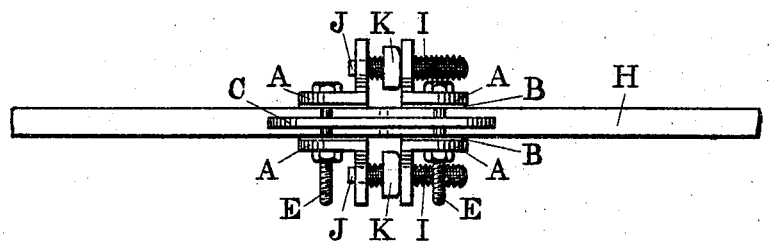
Figure 3:
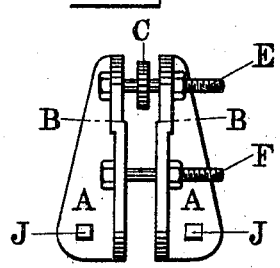
Figure 4:
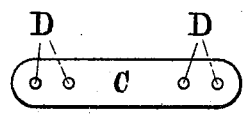

Figure 1, is a vertical side view of part of a wheel with our improved tire tightener attached. Fig. 2, is a top view of the same. Fig. 3, is a vertical end view of the device. Fig. 4, is a detail plan view of the coupling link.

Similar letters refer to similar parts throughout the several views.

The clamping jaws A. A are made of forged, or cast steel, malleable iron, or any other suitable metallic material formed as shown, the jaws are provided with offsets B formed to throw the upper part of the jaws out, to prevent the jaws from binding the tire, when the jaws are firmly clamped on the rim of the wheel, to be operated in expanding the rim. A connecting link C connects the clamps together at the upper ends, the link is provided at both ends with holes D. D, to lengthen or shorten the connection as desired, or to adapt the device to the form or distance of the spokes in various wheels, the link and the clamps are secured together by bolts E. E, the bolts passing through the jaws near the upper end and engaging the link between the jaws.

Clamping bolts F. F, are provided in the lower end of the jaws A. A, the jaws having oblong or slotted holes G. G to receive the bolts; when the jaws A. A are placed on the sides of the rim H they are clamped firmly on the rim by the bolts F. F, the oblong holes adapting the clamp to fit various sizes of rims, and yet keep the bolts close up to the under side of the rim when clamping.

Expanding screws I. I, are placed in the angle flanges of the jaws A. A, the expanding screws are provided with square heads J. J, on one end to prevent the screws from turning, the square heads are inserted in square holes provided in one side of the clamps for that purpose, the opposite side of the clamps is provided with round holes to permit the points of the screws I I to freely pass through the clamps, the screws are provided with nuts K. K, between the clamps as shown, the nuts when turned in one direction force the bottom ends of the clamps apart, and when turned in the reverse direction allow the ends to come closer together.

To operate the device, the clamping bolts F. F are taken out to permit the jaws of the clamps A. A, to straddle the rim H of the wheel, when so placed the clamping bolts are reinserted in the jaws below the wheel rim, the nuts on the bolts are then turned up to clamp the jaws firmly to the rim, the bolts E. E, being operated at the same time to keep the jaws in a vertical position; before clamping the jaws it is desirable to set them drawn together at the bottom as shown by dotted lines; the operation of the expanding screws to force the jaws apart will bring them to the position shown, opening the rim H at L sufficient to insert a wedge of hard wood or other suitable material, to keep the rim expanded to the tire, the clamp can then be taken off to repeat the operation on another wheel.

Having thus described our invention, what we claim, and desire to secure by Letters Patent, is—

1. In a tire tightener, the combination of clamping jaws and bolts the clamping bolts operating in oblong holes formed in the clamps, expanding screws with square heads placed in the angle flanges of the jaws the screws provided with nuts to operate the clamps, substantially as and for the purpose described.

2. In a tire tightener, the combination with the rim of a wheel of clamping jaws placed on both sides of a joint in the rim, the jaws clamped on the rim by bolts, a link connecting the clamps at one end, the opposite end of the clamps provided with expanding screws having nuts to operate the clamps, substantially as described.

In testimony whereof we affix our signatures in presence of two witnesses.

EDWARD WARD HAYS.
ELI ALEX THUSTON.

Witnesses:
CHAS. P. JONES,
C. H. COLE.